US008275076B2

(12) United States Patent
Jung et al.

(10) Patent No.: US 8,275,076 B2
(45) Date of Patent: Sep. 25, 2012

(54) RECEIVER AND METHOD FOR DETECTING SIGNAL IN MULTIPLE ANTENNA SYSTEM

(75) Inventors: Sung-Yoon Jung, Seoul (KR); Sung-Soo Hwang, Yongin-si (KR); Joo-Hyun Lee, Suwon-si (KR); Jong-Ho Lee, Seoul (KR); Sung-Hwan Kim, Suwon-si (KR); Jong-Soo Seo, Seoul (KR); Jong-Kyung Kim, Seoul (KR); Jin-Yong Choi, Suwon-si (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 616 days.

(21) Appl. No.: 12/386,299

(22) Filed: Apr. 16, 2009

(65) Prior Publication Data

US 2009/0262871 A1 Oct. 22, 2009

(30) Foreign Application Priority Data

Apr. 16, 2008 (KR) ........................ 10-2008-0035099

(51) Int. Cl.
*H04L 27/06* (2006.01)

(52) U.S. Cl. ........ 375/341; 375/349; 375/316; 455/272; 714/794

(58) Field of Classification Search .................. 375/341, 375/349, 316; 455/272; 714/794
See application file for complete search history.

(56) References Cited

U.S. PATENT DOCUMENTS

| 6,714,609 B1 * | 3/2004 | Keisala ........................ 375/349 |
| 2002/0161560 A1 * | 10/2002 | Abe et al. ...................... 702/196 |

* cited by examiner

*Primary Examiner* — Sam K Ahn
*Assistant Examiner* — Leila Malek

(57) ABSTRACT

Provided are a receiver and a method for detecting a signal in a multiple antenna system. The receiver includes a filter coefficient calculator and a signal detector. After separating a first signal portion and a second signal portion, the filter coefficient calculator calculates an MMSE filter coefficient using a Matrix Inversion Lemma such that an inverse matrix of the first signal portion has a predetermined constant value regardless of a repetition signal detection process. The signal detector detects a relevant transmission signal from an interference-removed reception signal using the MMSE filter coefficient.

20 Claims, 4 Drawing Sheets

RECEIVER AND METHOD FOR DETECTING SIGNAL IN MULTIPLE ANTENNA SYSTEM

CROSS-REFERENCE TO RELATED APPLICATION(S) AND CLAIM OF PRIORITY

The present application claims the benefit under 35 U.S.C. §119 to an application filed in the Korean Intellectual Property Office on Apr. 16, 2008 and assigned Serial No. 10-2008-0035099, the contents of which are incorporated herein by reference.

TECHNICAL FIELD OF THE INVENTION

The present invention relates generally to a multiple antenna system, and more particularly, to a receiver and a method for detecting a signal, having a low complexity on the basis of Minimum Mean Squared Error (MMSE)-Soft Interference Cancellation (SIC).

BACKGROUND OF THE INVENTION

Multiple Input Multiple Output (MIMO) technology is technology for transmitting signals using a multiple antenna at both a transmission end and a reception end. MIMO technology has high reliability and provides a high data transmission rate by increasing a channel capacity within a limited frequency resource.

Up to now, in order to effectively receive independent signals transmitted from a plurality of transmission antennas, a reception scheme through reiterative information exchange between a decoder and a detector has been actively studied, and in particular, it is known that a reiterative signal detection scheme using Maximum A Posteriori Probability (MAP) provides an almost optimum reception performance. However, in the MAP-based detection scheme, complexity rapidly increases depending on the number of transmission antennas and the number of data bits per transmission signal. To address this complexity problem, a reiterative reception scheme using SIC and an MMSE detection scheme is proposed.

In a conventional MMSE-SIC detection scheme, to detect a signal $x_m$ transmitted from an m-th transmission antenna of M transmission antennas during a process of detecting an i-th repetition signal, an interference signal that would have been transmitted from a different antenna is removed from a reception signal r as in Equation 1:

$$y_m^{(i)} = r - H_m \tilde{x}_m^{(i)} \quad \text{[Eqn. 1]}$$

where an index i is the frequency of repetition signal detection, $y_m^{(i)}$ is a signal vector transmitted via an m-th transmission antenna during a process of detecting an i-th repetition signal, r is a reception signal vector, $H_m = [h_1 \ldots h_{m-1} h_{m+1} \ldots h_M]$ is a matrix obtained by removing an m-th column from an N×M-channel matrix H (M is the number of transmission antennas, and N is the number of reception antennas), and $$\tilde{x}_m^{(i)} = [\bar{x}_1^{(i)} \ldots \bar{x}_{m-1}^{(i)} \bar{x}_{m+1}^{(i)} \ldots \bar{x}_M^{(i)}]^T$$

is an average value vector of (M−1) transmission signals except an m-th transmission signal $x_m$ to be actually detected. An average value $$\bar{x}_j^{(i)} = \sum_{x \in \Omega} x Pr[x_j = x] (j = 1, \ldots, M, \Omega:$$

constellation set) of a signal $x_j$ transmitted from an j-th transmission antenna, is obtained using an (i−1)-th Log Likelihood Ratio (LLR) of a transmission signal bit calculated by a channel decoder during a prior (i−1)-th repetition process. Since an LLR(i−1) value of a data bit is 0 when an initial signal is detected (i=1), $\bar{x}_j^{(1)} = 0$.

To detect a signal $x_m$ transmitted from an m-th transmission antenna of M transmission antennas as in Equation 1, interference signals, that is, signals transmitted from (M−1) different antennas except the m-th transmission antenna are removed from a reception signal, and then an MMSE filtering coefficient $G_m^{(i)}$ is obtained as in Equations 2a and 2b, so that a signal $z_m^{(i)}$ actually transmitted from the m-th antenna is detected.

$$z_m^{(i)} = (G_m^{(i)})^H y_m^{(i)} \quad \text{[Eqn. 2a]}$$

$$G_m^{(i)} = (H_m Q_m^{(i)} H_m + \sigma_x^2 h_m h_m^H + \sigma^2 I_N)^{-1} \sigma_x^2 h_m \quad \text{[Eqn. 2b]}$$

where $y_m^{(i)}$ is a signal vector transmitted via the m-th transmission antenna during a process of detecting an i-th repetition signal, $$Q_m^{(i)} = \sigma_x^2 I_M - \text{diag}(|\bar{x}_1^{(i)}|^2, \ldots, |\bar{x}_{m-1}^{(i)}|^2, |\bar{x}_{m+1}^{(i)}|^2, \ldots, |\bar{x}_M^{(i)}|^2)$$

is an (M−1)×(M−1) interference signal matrix, $h_m$ is an m-th column of H, $\sigma_x^2$ is power of a transmission signal, $\sigma^2$ is power of a white noise, $I_N$ is an N×N-unit matrix, and $(\bullet)^H$ is a conjugate transpose matrix.

Therefore, according to the conventional MMSE-SIC signal detection scheme, an inverse matrix of an N×N matrix should be calculated every process of detecting an repetition signal in order to detect $x_m$. Generally, since an inverse matrix operation represents complexity of $O(N^3)$, assuming that maximum L times of soft information exchange are repeated between a decoder and a detector, an operation amount of $O(N^3 ML)$ is required in order to detect a total of M transmission signals (i=1, 2, ..., L).

As described above, the MMSE-SIC based signal detection scheme shows low complexity compared to a conventional MAP based signal detection scheme, but an inverse matrix of a square matrix having a size of the number of reception antennas should be calculated whenever information exchange is reiteratively performed between a decoder and a detector. Therefore, high complexity is required in order to detect a repetition signal.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to provide a receiver and a method capable of reducing the frequency of inverse matrix calculations required for detecting a signal when a multiple antenna system detects a signal on the basis of MMSE-SIC.

According to an aspect of the present invention, a receiver for detecting a signal in a multiple antenna system is provided. The receiver includes: a filter coefficient calculator for, after separating a first signal portion and a second signal portion, calculating a MMSE filter coefficient using Matrix Inversion Lemma so that an inverse matrix of the first signal portion has a predetermined constant value regardless of a repetition signal detection process; and a signal detector for detecting a relevant transmission signal from an interference-removed reception signal using the MMSE filter coefficient.

According to another aspect of the present invention, a reception method for detecting a signal in a multiple antenna system is provided. The method includes: after separating a first signal portion and a second signal portion, calculating a MMSE filter coefficient using Matrix Inversion Lemma so that an inverse matrix of the first signal portion has a predetermined constant value regardless of a repetition signal detection process; and detecting a relevant transmission signal using the MMSE filter coefficient.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features and advantages of certain exemplary embodiments of the present invention will be more apparent from the following description taken in conjunction with the accompanying drawings in which.

DETAILED DESCRIPTION OF THE INVENTION

FIGS. 1A through 4B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Preferred embodiments of the present invention will be described herein below with reference to the accompanying drawings. In the following description, well-known functions or constructions are not described in detail since they would obscure the invention in unnecessary detail. Terminologies described below are defined with consideration of functions in the present invention, and can change depending on the intention or practice of a user or operator. Therefore, the definitions should be determined on the basis of the descriptions over the specification.

Exemplary embodiments of the present invention provide a receiver and a method for detecting a signal in a multiple antenna system. Particularly, exemplary embodiments of the present invention provide a receiver and a method for reducing complexity in order to detect a signal on the basis of MMSE-SIC.

Figure 1A:
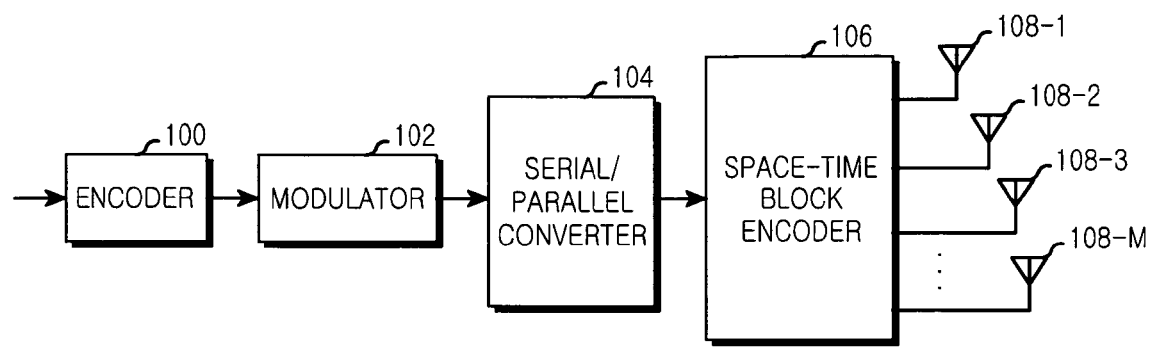
FIGS. 1A and 1B illustrate a block diagram of a transmitter and a receiver in a multiple antenna system according to an exemplary embodiment of the present invention.
Figure 1B:
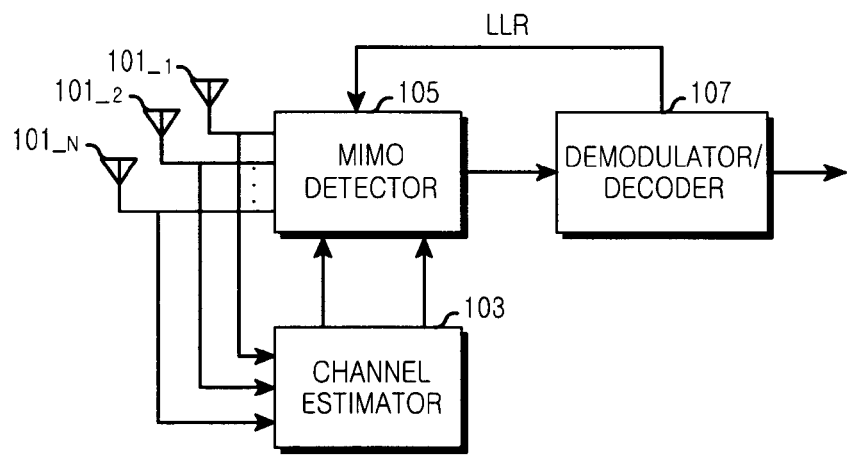

FIGS. 1A and 1B illustrate a transmitter and a receiver in a multiple antenna system according to an exemplary embodiment of the present invention. The transmitter includes M transmission antennas and the receiver includes N reception antennas.

Referring to FIG. 1A, the transmitter with a plurality of antennas (108-1 to 108-M) includes an encoder 100, a modulator 102, a serial/parallel converter 104, and a space-time block encoder 106.

The encoder 100 encodes information data in a convolution code scheme or a turbo code scheme according to an encoding rate, and outputs the encoded data to the modulator 102. The modulator 102 modulates the encoded data from the encoder 100 using a predetermined modulation scheme (for example, M-ary Phase Shift Keying (M-PSK), and M-ary Quadrature Amplitude Modulation (MQAM)), and outputs a modulation symbol. The serial/parallel converter 104 converts the modulation symbol, which is output from the modulator 102 and is a serial symbol, into a parallel symbol, and outputs the parallel symbol to the space-time block encoder 106. The space-time block encoder 106 can be realized using one of Space-Time Block Code (STBC), Space-Frequence Trellis Code (SFTC), and Space-Frequence Block Code (SFBC).

Referring to FIG. 1B, the receiver with a plurality of antennas (101-1 to 101-N) includes a channel estimator 103, an MIMO detector 105, and a demodulator/decoder 107.

The channel estimator 103 receives signals received through a plurality of antennas 101-1 to 101-N, estimates channel coefficients representing channel gains, and outputs the estimated channel coefficients to the MIMO detector 105. That is, the channel estimator 103 estimates the channel coefficients representing channel gains from the transmission antennas 108-1 to 108-M of the transmitter to the reception antennas 101-1 to 101-N. At this point, a size of a channel matrix including the channel coefficients is M×N.

The MIMO detector 105 removes an interference signal from signals received via the reception antennas 101-1 to 101-N. At this point, the interference signal is obtained using a value of an LLR of an encoded bit obtained by calculating a prior repetition process of the demodulator/decoder 107. The MIMO detector 105 obtains an MMSE filter coefficient, detects a transmission signal transmitted from a corresponding transmission antenna, and outputs the detected transmission signal to the demodulator/decoder 107.

The MIMO detector 105 is described in detail with reference to FIG. 2.

The demodulator/decoder 107 recovers original encoded bits by demodulating symbols from the MIMO detector 105 using a predetermined demodulation scheme, decodes the encoded bits in correspondence to the encoder of the transmitter, and outputs information bits. Also, the demodulator/decoder 107 feeds back an LLR value of an encoded bit obtained by calculating a prior repetition process, to the MIMO detector 105.

Figure 2:
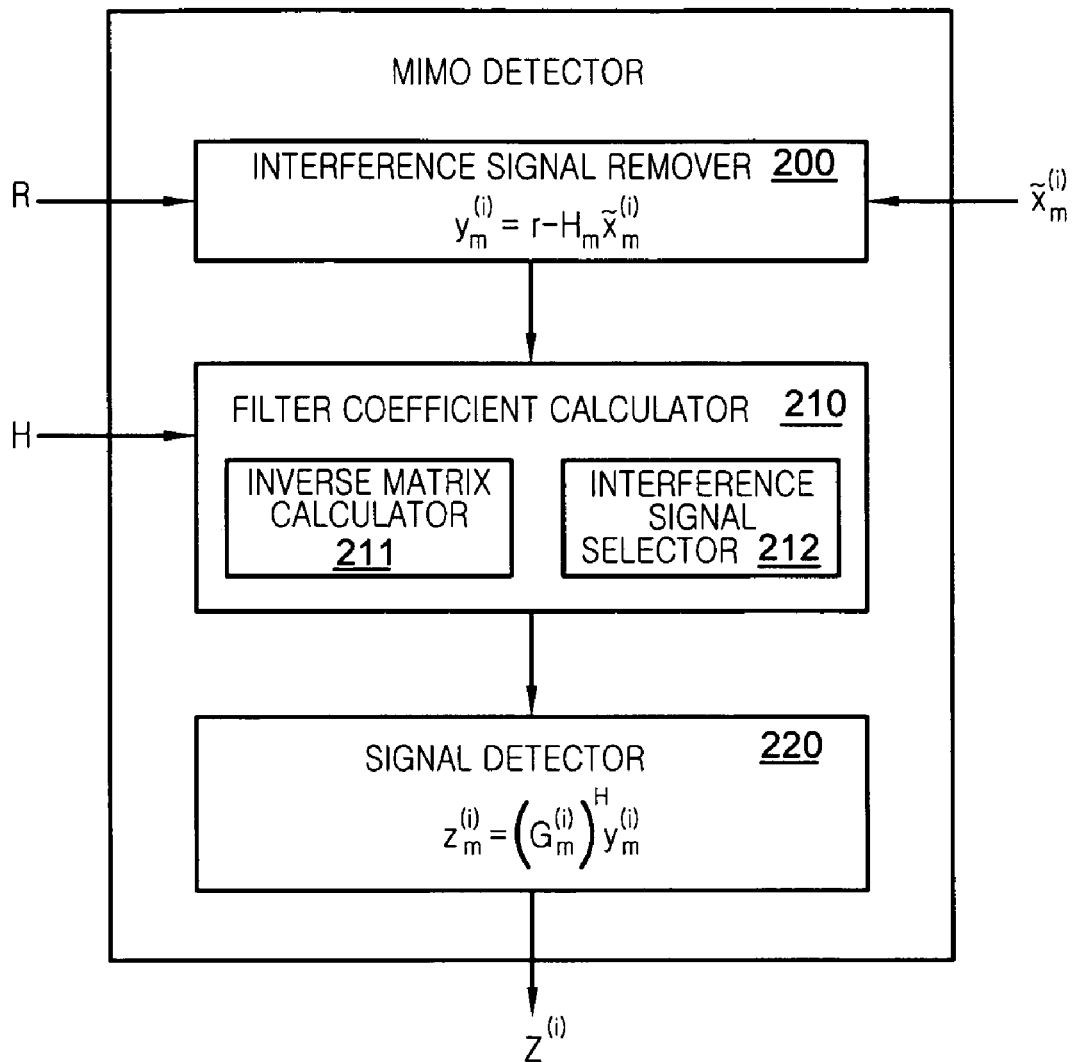
FIG. 2 illustrates a detailed block diagram for a MIMO detector according to an exemplary embodiment of the present invention.

FIG. 2 illustrates in detail the MIMO detector 105 according to an exemplary embodiment of the present invention.

Referring to FIG. 2, the MIMO detector 105 includes an interference signal remover 200, a filter coefficient calculator 210, and a signal detector 220.

The interference signal remover 200 removes interference signals from signals r received via the reception antennas 101-1 to 101-N (refer to Equation 1 above). Interference signals are signals transmitted via other transmission antennas except a signal from a transmission antenna to be detected. The interference signal remover 200 is provided with an average value of signals transmitted via the other transmission antennas from the demodulator/decoder 107.

For example, when the receiver intends to detect a signal $x_m$ transmitted via an m-th transmission antenna of the transmitter, the receiver removes signals transmitted via (M−1) transmission antennas except the m-th transmission signal $x_m$ from the reception signal r. An average value of signals transmitted from the (M−1) transmission antennas is obtained from an LLR value of an encoded bit at the prior repetition process, received from the demodulator/decoder 107.

The filter coefficient calculator 210 is provided with channel matrix information from the channel estimator 103, and fed back an average value of signals transmitted via the different (M−1) transmission antennas except the m-th transmission antenna from the demodulator/decoder 107 to calculate an MMSE filter coefficient $G_m^{(i)}$. $G_m^{(i)}$ may be obtained using Equation 3 below. Equation 3 is a different expression of Equation 2 for calculating an existing MMSE filter coefficient.

$$G_m^{(i)} = \left( \sigma_x^2 HH^H + \sigma^2 I_N - \sum_{j=1, j \neq m}^{M} v_j^{(i)}(v_j^{(i)})^H \right)^{-1} \sigma_x^2 h_m \quad \text{[Eqn. 3]}$$

where $\sigma_x^2$ is power of a transmission signal, $\sigma^2$ is power of a white noise, H is a channel matrix having a size of M×N, $I_N$ is an N×N-unit matrix, $(\bullet)^H$ is a conjugate transpose matrix, M is the number of transmission antennas, N is the number of reception antennas, $h_m$ is an m-th column of H, and $v_j^{(i)} = |\bar{x}_j^{(i)}| h_j$ (j=1, 2, ..., m−1, m+1, ..., M) is an interference signal generated by a signal $x_j$ transmitted from an antenna j when a transmission signal $x_m$ is detected.

According to an exemplary embodiment of the present invention, when two transmission antennas are used, that is, M=2 in order to reduce complexity in a process of calculating the MMSE filter coefficient $G_m^{(i)}$, Equation 3 can be expressed by Equations 4a and 4b using Matrix Inversion Lemma.

$$G_m^{(i)} = \left( \sigma_x^2 HH^H + \sigma^2 I_N - v_j^{(i)}(v_j^{(i)})^H \right)^{-1} \sigma_x^2 h_m, \, j \neq m \quad \text{[Eqn. 4a]}$$

$$= \left( T^{-1} + \frac{1}{\beta^{(i)}} u_m^{(i)} (u_m^{(i)})^H \right) \sigma_x^2 h_m \quad \text{[Eqn. 4b]}$$

Here, substitution is made by $T = \sigma_x^2 HH^H + \sigma^2 I_N$, $u_m^{(i)} = T^{-1} v_j^{(i)}$, and $\beta^{(i)} = 1 - (v_j^{(i)})^H T^{-1} v_j^{(i)}$.

That is, Equations 4a and 4b separate a portion of $\sigma_x^2 HH^H + \sigma^2 I_N$ by a channel and a white noise, and a portion of an interference signal $v_j^{(i)}(v_j^{(i)})^H$ generated from other antennas to define a matrix T for the channel and the white noise. By arranging the terms in Equations 4a and 4b using an inverse matrix of the T matrix, calculation of an inverse matrix of the matrix T is required only one time in order to detect M transmission signals, and only $u_m^{(i)}$ and $\beta^{(i)}$ are updated during a repetition process where information regarding a transmission signal is updated from the demodulator/decoder 107. A new inverse matrix does not need to be calculated. On the other hand, referring to Equation 3, an inverse matrix of $(\bullet)^{-1}$ should be calculated in order to obtain $G_m^{(i)}$ every repetition process where information regarding a transmission signal is updated from the demodulator/decoder 107.

However, an MMSE filter coefficient $G_m^{(i)}$ can be arranged as in Equations 4a and 4b only in the case where the number of transmission antennas is two, that is, M=2. Therefore, in the case where three or more transmission antennas are used, that is, M≧3, Equation 3 cannot be directly converted into the form of Equations 4a and 4b. In this case, an interference signal having a greatest influence is selected from (M−1) interference signals as in Equation 5, and an MMSE filter coefficient $G_m^{(i)}$ is determined in the same manner as in Equation 4.

$$v_j^{(i)} = \arg \max_{v_k^{(i)}, k \neq m} \|v_k^{(i)}\|^2 \quad \text{[Eqn. 5]}$$

where $v_j^{(i)}$ is an interference signal generated by a signal transmitted via a transmission antenna j. That is, in the case where there exist M transmission antennas, an interference signal having a greatest influence is selected from interference signals generated by signals transmitted via the rest of (M−1) transmission antennas except a signal from a transmission antenna to be detected, and substation is made as in Equations 4a and 4b with consideration of an interference signal between a signal from an m-th transmission antenna and a signal from a j-th transmission antenna having a greatest influence.

An inverse matrix calculator 211 of the filter coefficient calculator 210 calculates an inverse matrix of the above-defined T matrix regardless of information provided from the demodulator/decoder 107. An interference signal selector 212 selects an interference signal having a greatest influence on a signal to be currently detected from transmission signals via different transmission antennas.

Therefore, an MMSE-SIC signal detection scheme according to an exemplary embodiment of the present invention requires only one time of calculation of an inverse matrix in order to detect M transmission signals regardless of the frequency of repeated detection. Since an operation amount of about O(NM) is required for selecting an interference signal, total complexity can be represented by $O(N^3) + O(NM^2L)$. Here, M is the number of transmission antennas, N is the number of reception antennas, and L is the frequency of repeated detection.

The signal detector 220 detects a transmission signal $z_m^{(i)}$ actually transmitted from an m-th transmission antenna by multiplying an MMSE filter coefficient $G_m^{(i)}$ calculated by the filter coefficient calculator 210 by a reception signal $y_m^{(i)}$ from which an interference has been removed by the interference signal remover 200.

Figure 3:
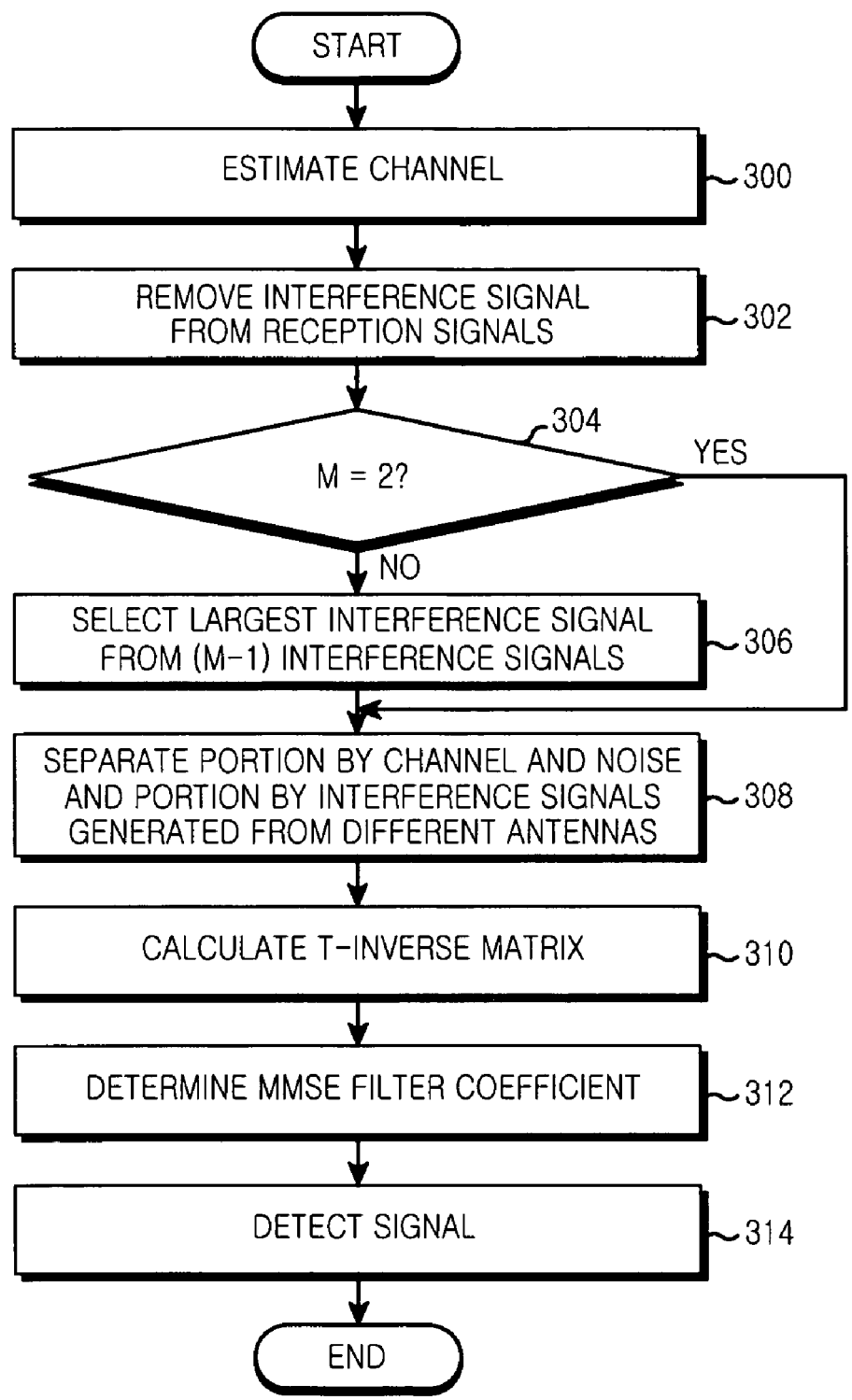
FIG. 3 illustrates a flowchart of detecting a signal in a multiple antenna system according to an exemplary embodiment of the present invention.

FIG. 3 illustrates a flowchart for detecting a signal in a multiple antenna system according to an exemplary embodiment of the present invention.

Referring to FIG. 3, in step 300, the receiver receives signals received via a plurality of reception antennas 101-1 to 101-N and estimates channel coefficients representing channel gains. At this point, the size of a channel matrix including the channel coefficients is M×N.

In step 302, the receiver removes signals transmitted via different transmission antennas except a relevant transmission antenna from reception signals in order to detect a signal transmitted via the relevant transmission antenna from the signals received via the reception antennas 101-1 to 101-N. The signals transmitted via the other transmission antennas except the relevant transmission antenna can be obtained from an LLR of an encoded bit obtained through calculation of a prior repetition process.

In step 304, the receiver determines the number of the transmission antennas. When the number of the transmission antennas is two, the receiver performs step 308. When the number of the transmission antennas is not two (that is, the number of the transmission antennas is three or more), the receiver performs step 306 to select a largest interference signal from (M−1) interference signals (signals transmitted via (M−1) transmission antennas except the relevant transmission antenna). This is for performing substitution as in Equations 4a and 4b even in the case where the number of the transmission antenna is three or more. For example, when signals are transmitted via four transmission antennas, an interference signal having a greatest influence on a signal transmitted via a first transmission antenna is selected from the rest of three transmission antennas and calculated as in Equations 4a and 4b in order to detect the signal transmitted via the first transmission antenna.

In step 308, the receiver separates a portion by a channel and a noise (T matrix in Equation 4b) and a portion of interference signals generated from the different transmission antennas. This is for reducing an operation process of an inverse matrix when an MMSE filter coefficient is calculated (refer to Equations 4a-4b and Equation 5).

In step 310, the receiver calculates a T-inverse matrix, and in step 312, determines an MMSE filter coefficient. The T matrix includes invariable values which do not change during a repetition process.

In step 314, the receiver detects a signal using the MMSE filter coefficient.

Thereafter, the receiver ends a signal detection procedure.

FIG. 4 illustrates a performance result graph according to an exemplary embodiment of the present invention.

Figure 4A:
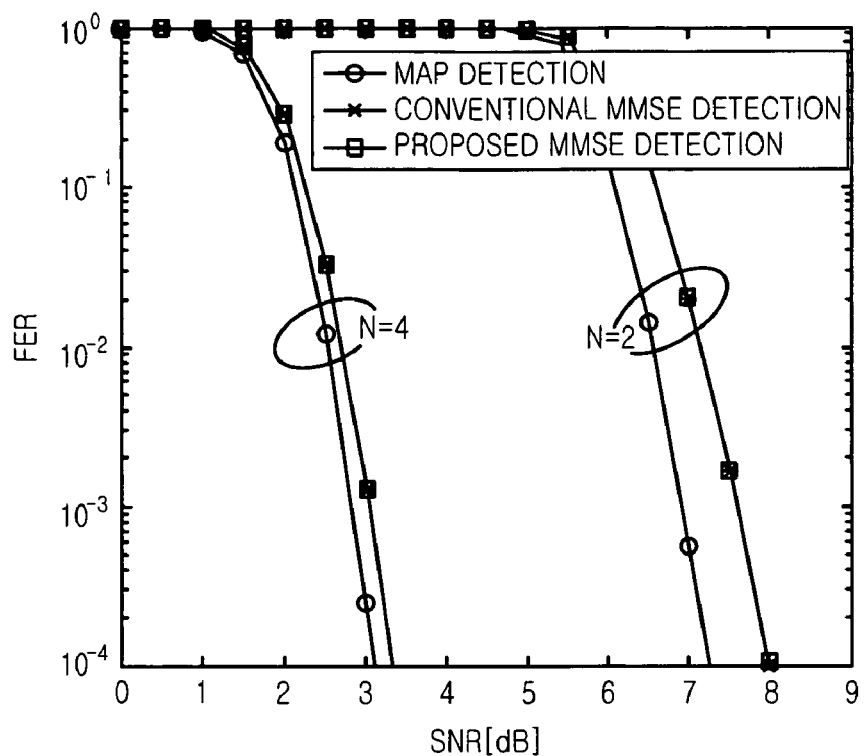
FIGS. 4A and 4B illustrate a graph illustrating performance results according to an exemplary embodiment of the present invention.
Figure 4B:
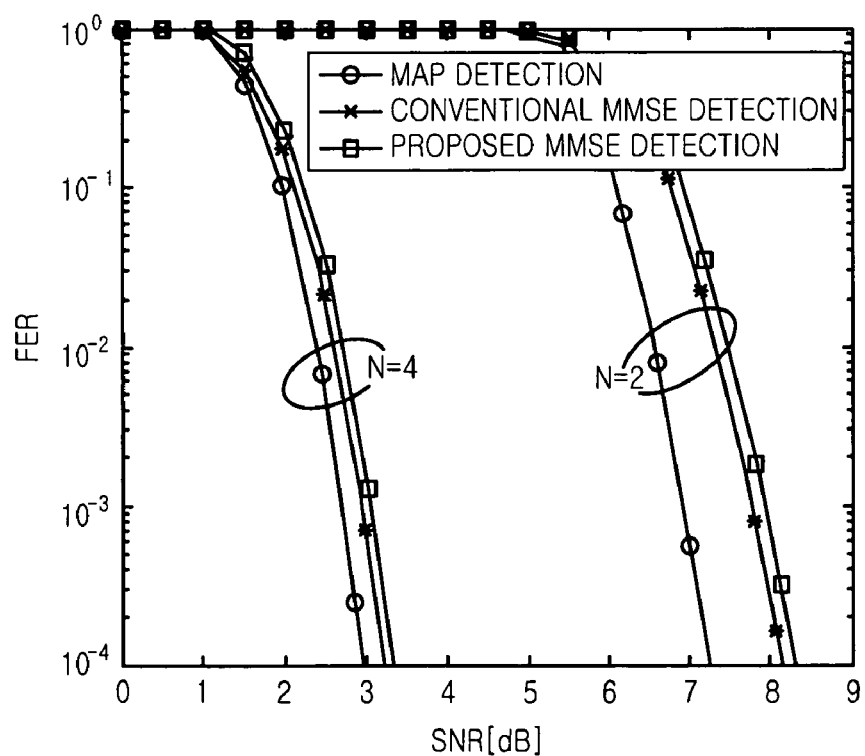

FIGS. 4A and 4B illustrate a Frame Error Rate (FER) performance of an MMSE-SIC signal detection proposed by the present invention which depends on the number of transmission/reception antennas when a block Low-density parity-check (LDPC) codes having an encoding rate of 0.5 has been used in an independent fading channel environment. Quadrature Phase Shift Keying (QPSK) modulation has been used as a modulation scheme, and the frequency of repeated detection has been set to L=5.

Referring to FIG. 4A, when the number of transmission antennas is two, complexity is low and the same performance as the conventional MMSE-SIC detection scheme is represented. Referring to FIG. 4B, when the number of transmission antennas is three or more, an interference signal is selected and used, so that a Signal-to-Noise Ratio (SNR) performance deterioration of about 0.3 dB is represented in comparison with the conventional scheme.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

As described above, the complexity of a receiver can be reduced by reducing the frequency of inverse matrix calculations required for detecting a signal when a multiple antenna system detects a signal on the basis of MMSE-SIC.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A receiver for detecting configured to detect a signal in a multiple antenna system, the receiver comprising:
a filter coefficient calculator configured to calculate a Minimum Mean Squared Error (MMSE) filter coefficient using Matrix Inversion Lemma such that an inverse matrix of a first signal portion has a constant value regardless of a repetition signal detection process considering a second signal portion; and
a signal detector configured to detect a relevant transmission signal from an interference-removed reception signal using the MMSE filter coefficient,
wherein the filter coefficient calculator comprises:
an interference signal selector configured to select, as the second signal portion, an interference signal whose interference level is largest from signals received via other transmission antennas except a relevant transmission antenna, when the number of the transmission antennas is at least three; and
an inverse matrix calculator configured to calculate the inverse matrix of the first signal portion,
wherein the MMSE filter coefficient is configured to be calculated using the following Equations:

$$G_m^{(i)} = \left(\sigma_x^2 HH^H + \sigma^2 I_N - v_j^{(i)}(v_j^{(i)})^H\right)^{-1}\sigma_x^2 h_m, \ j \neq m \text{ and}$$

$$= \left(T^{-1} + \frac{1}{\beta^{(i)}} u_m^{(i)}(u_m^{(i)})^H\right)\sigma_x^2 h_m$$

where $\sigma_x^2$ is power of a transmission signal, $\sigma^2$ is power of a white noise, H is a channel matrix having a size of M×N, $I_N$ is an N×N-unit matrix, (•)H is a conjugate transpose matrix, M is the number of transmission antennas, N is the number of reception antennas, $h_m$ is an m-th column of H, $$v_j^{(i)} = |\bar{x}_{j(i)}|h_j$$

(j=1, 2, . . . , m−1, m+1, . . . , M) is an interference signal generated by a signal $x_j$ transmitted from an antenna j when a transmission signal $x_m$ is detected, $T=\sigma_x^2 HH^H+\sigma^2 I_N$, $u_m^{(i)}=T^{-1}v_j^{(i)}$, $\beta^{(i)}=1-(v_j^{(i)})^H T^{-1}v_j^{(i)}$, and when the number of the transmission antennas is at least three, a signal $v_j^{(j)}$ having a greatest interference is selected.

2. The receiver of claim 1, wherein the first signal portion comprises a signal comprising a channel interference and a white noise, and the second signal portion comprises interference signals generated from other antennas.

3. The receiver of claim 1, further comprising an interference signal remover configured to remove interference signals from other transmission antennas except a relevant transmission antenna from the reception signal.

4. The receiver of claim 3, wherein the interference signal comprises an average signal obtained using a Log-Likelihood Ratio (LLR) value of data bits calculated during a prior repetition signal detection process.

5. The receiver of claim 1, further comprising a decoder configured to decode the detected relevant signal.

6. The receiver of claim 1, wherein the filter coefficient calculator is configured to calculate the inverse matrix a single time to detect the transmission signal.

7. A reception method for detecting a signal in a multiple antenna system, the method comprising:
calculating, using a MIMO detector, a Minimum Mean Squared Error (MMSE) filter coefficient using Matrix Inversion Lemma such that an inverse matrix of a first signal portion has a constant value regardless of a repetition signal detection process considering a second signal portion; and
detecting a relevant transmission signal using the MMSE filter coefficient,
wherein the calculating of the MMSE filter coefficient comprises:
selecting, as the second signal portion, an interference signal whose interference level is largest from signals received via other transmission antennas except a relevant transmission antenna, when the number of the transmission antennas is at least three, and
calculating the inverse matrix of the first signal portion, and
wherein the MMSE filter coefficient is calculated using the following Equations:

$$G_m^{(i)} = \left(\sigma_x^2 HH^H + \sigma^2 I_N - v_j^{(i)}(v_j^{(i)})^H\right)^{-1} \sigma_x^2 h_m, \quad j \neq m \text{ and}$$

$$= \left(T^{-1} + \frac{1}{\beta^{(i)}} u_m^{(i)}(u_m^{(i)})^H\right) \sigma_x^2 h_m$$

where $\sigma_x^2$ is power of a transmission signal, $\sigma^2$ is power of a white noise, H is a channel matrix having a size of M×N, $I_N$ is an N×N-unit matrix, (•)H is a conjugate transpose matrix, M is the number of transmission antennas, N is the number of reception antennas, $h_m$ is an m-th column of H, $$v_j^{(j)} = |\bar{x}_{j^{(i)}}| h_j$$

(j=1, 2, . . . m−1, m+1, . . . , M) is an interference signal generated by a signal $x_j$ transmitted from an antenna j when a transmission signal $x_m$ is detected, $T=\sigma_x^2 HH^H + \sigma^2 I_N$, $u_m^{(i)}=T^{-1}v_j^{(i)}$, $\beta^{(i)}=1-(v_j^{(i)})^H T^{-1} v_j^{(i)}$, when the number of the transmission antennas is at least three, a signal $v_j^{(j)}$ having a greatest interference is selected.

8. The method of claim 7, wherein the first signal portion comprises a signal comprising a channel interference and a white noise, and the second signal portion comprises interference signals generated from other antennas.

9. The method of claim 7, further comprising removing interference signals from other transmission antennas except a relevant transmission antenna from the reception signal.

10. The method of claim 9, wherein the interference signal comprises an average signal obtained using a Log-Likelihood Ratio (LLR) value of data bits calculated during a prior repetition signal detection process.

11. The method of claim 7, further comprising decoding the detected relevant signal.

12. The method of claim 7, further comprising calculating the inverse matrix a single time to detect the transmission signal.

13. Code embodied on a non-transitory computer-readable medium configured to, when executed on a computer, perform at least the following:
calculate a Minimum Mean Squared Error (MMSE) filter coefficient using Matrix Inversion Lemma such that an inverse matrix of a first signal portion has a constant value regardless of a repetition signal detection process considering a second signal portion; and
detect a relevant transmission signal using the MMSE filter coefficient,
wherein the calculating of the MMSE filter coefficient comprises:
selecting, as the second signal portion, an interference signal whose interference level is largest from signals received via other transmission antennas except a relevant transmission antenna, when the number of the transmission antennas is at least three, and
calculating the inverse matrix of the first signal portion, and
wherein the MMSE filter coefficient is configured to be calculated using the following Equations:

$$G_m^{(i)} = \left(\sigma_x^2 HH^H + \sigma^2 I_N - v_j^{(i)}(v_j^{(i)})^H\right)^{-1} \sigma_x^2 h_m, \quad j \neq m \text{ and}$$

$$= \left(T^{-1} + \frac{1}{\beta^{(i)}} u_m^{(i)}(u_m^{(i)})^H\right) \sigma_x^2 h_m$$

where $\sigma_x^2$ is power of a transmission signal, $\sigma^2$ is power of a white noise, H is a channel matrix having a size of M×N, $I_N$ is an N×N-unit matrix, (•)H is a conjugate transpose matrix, M is the number of transmission antennas, N is the number of reception antennas, $h_m$ is an m-th column of H, $$v_j^{(j)} = |\bar{x}_{j^{(i)}}| h_j$$

(j=1, 2, . . . , m−1, m+1, . . . , M) is an interference signal generated by a signal $x_j$ transmitted from an antenna j when a transmission signal $x_m$ is detected, $T=\sigma_x^2 HH^H + \sigma^2 I_N$, $u_m^{(i)}=T^{-1}v_j^{(i)}$, $\beta^{(i)}=1-(v_j^{(i)})^H T^{-1} v_j^{(i)}$, and when the number of the transmission antennas is at least three, a signal $v_j^{(j)}$ having a greatest interference is selected.

14. The code of claim 13, further configured to remove interference signals from other transmission antennas except a relevant transmission antenna from the reception signal.

15. The code of claim 13, wherein the interference signal comprises an average signal obtained using a Log-Likelihood Ratio (LLR) value of data bits calculated during a prior repetition signal detection process.

16. The code of claim 13, further comprising an interference signal remover configured to remove interference signals from other transmission antennas except a relevant transmission antenna from the reception signal.

17. The code of claim 16, wherein the interference signal comprises an average signal obtained using a Log-Likelihood Ratio (LLR) value of data bits calculated during a prior repetition signal detection process.

18. The code of claim 13, further configured to decode the detected relevant signal.

19. The code of claim 13, wherein the code is executed on a MIMO detector.

20. The code of claim 13, further configured to calculate the inverse matrix a single time to detect the transmission signal.

* * * * *